Sept. 26, 1967     T. E. TROUT     3,343,575
TREE AND BRUSH ROTARY SAW ATTACHMENT
Filed July 9, 1965     4 Sheets-Sheet 1
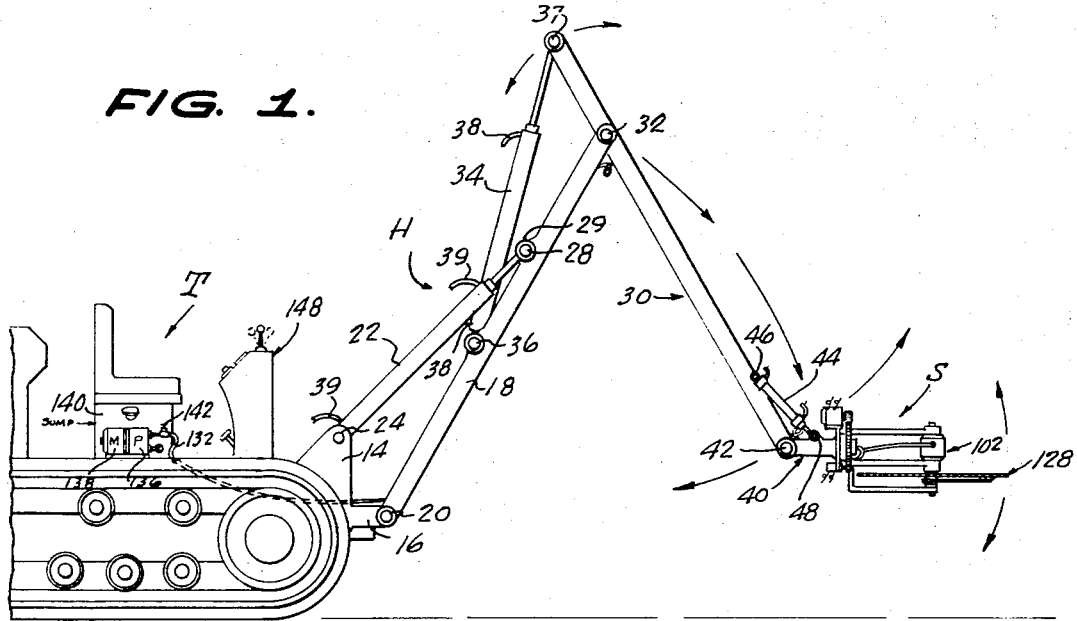
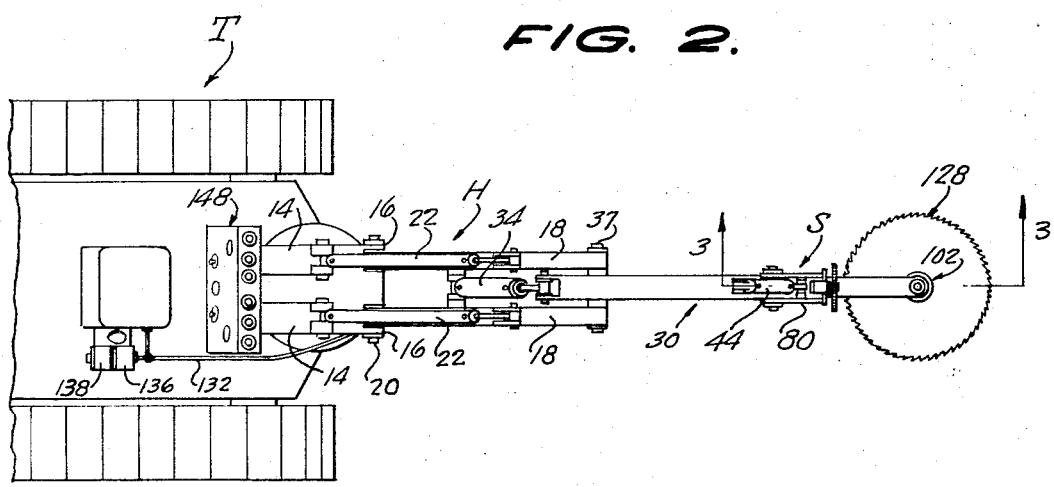
INVENTOR.
THOMAS E. TROUT,
BY
Berman, Davidson & Berman
ATTORNEYS.

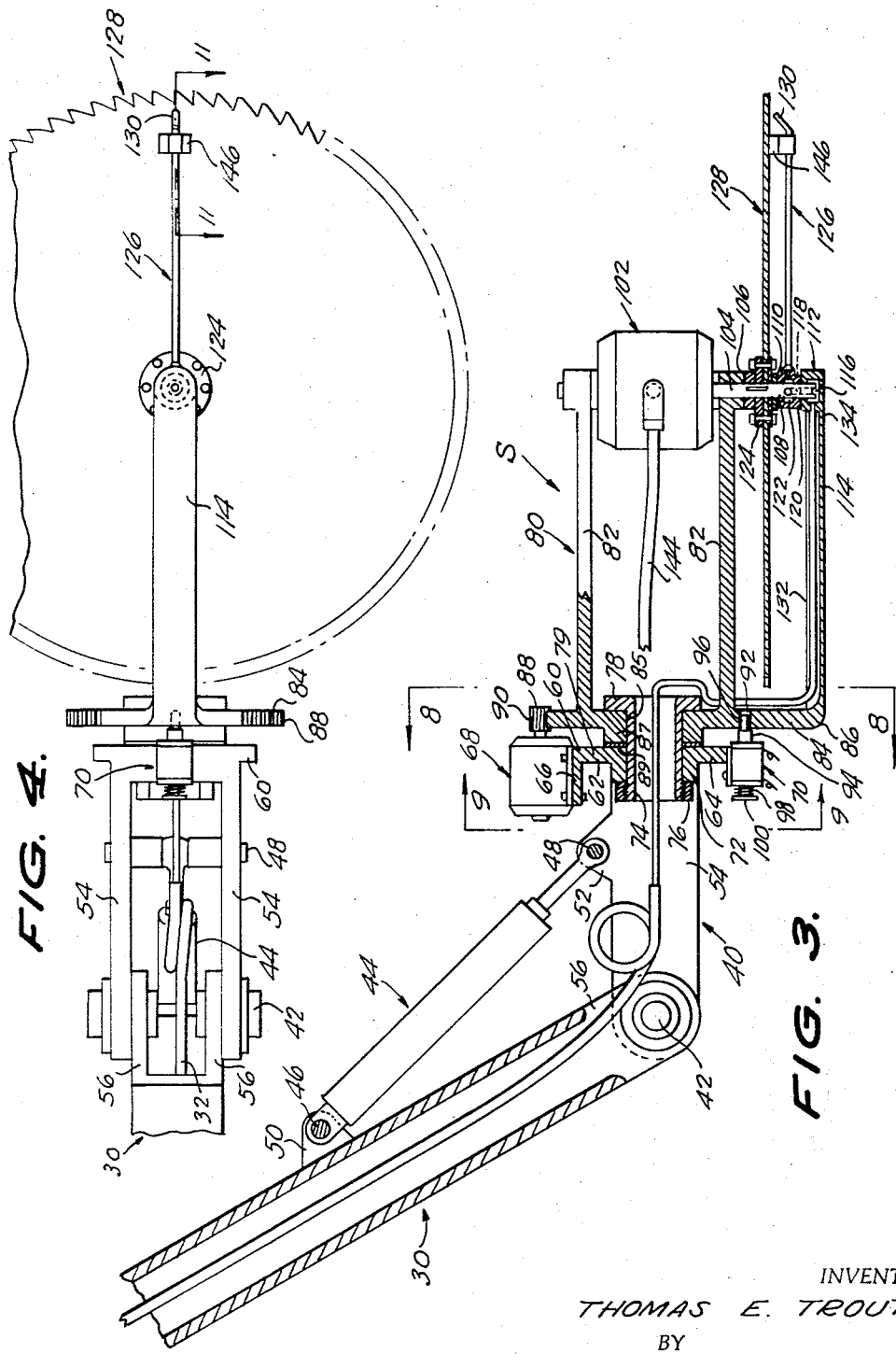

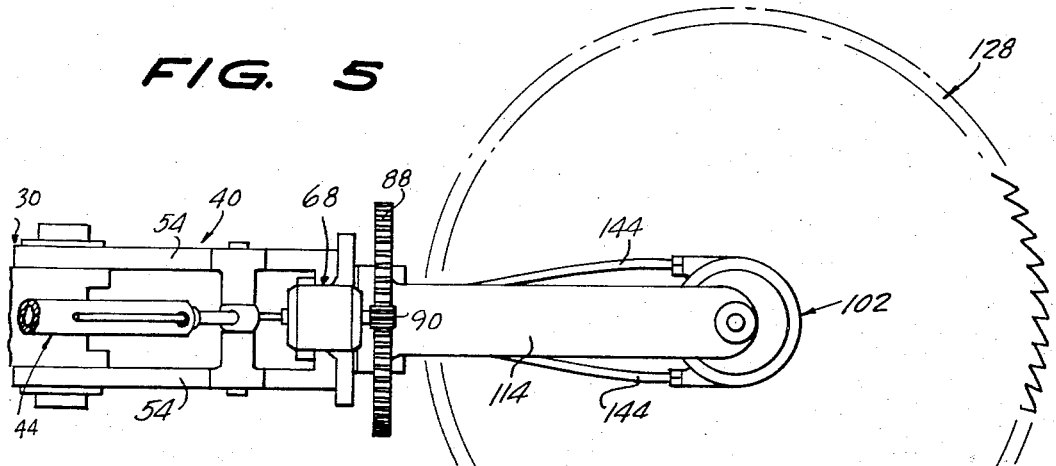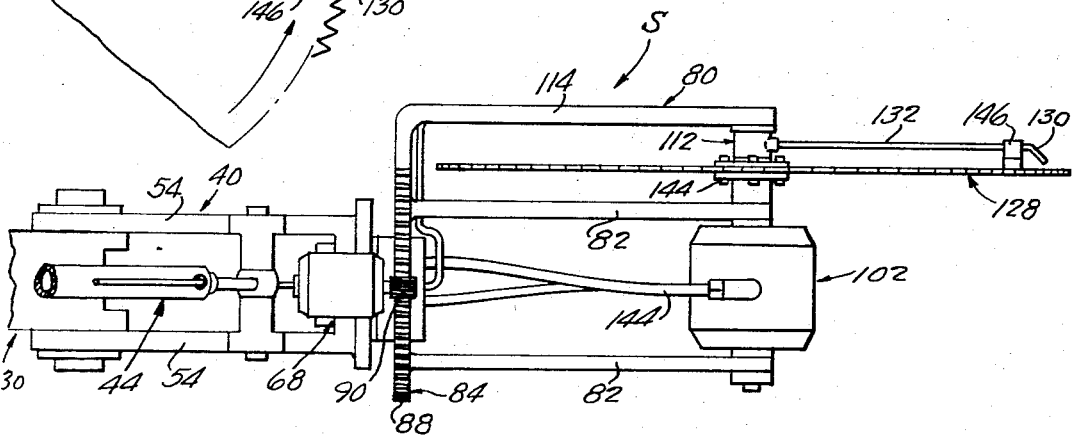

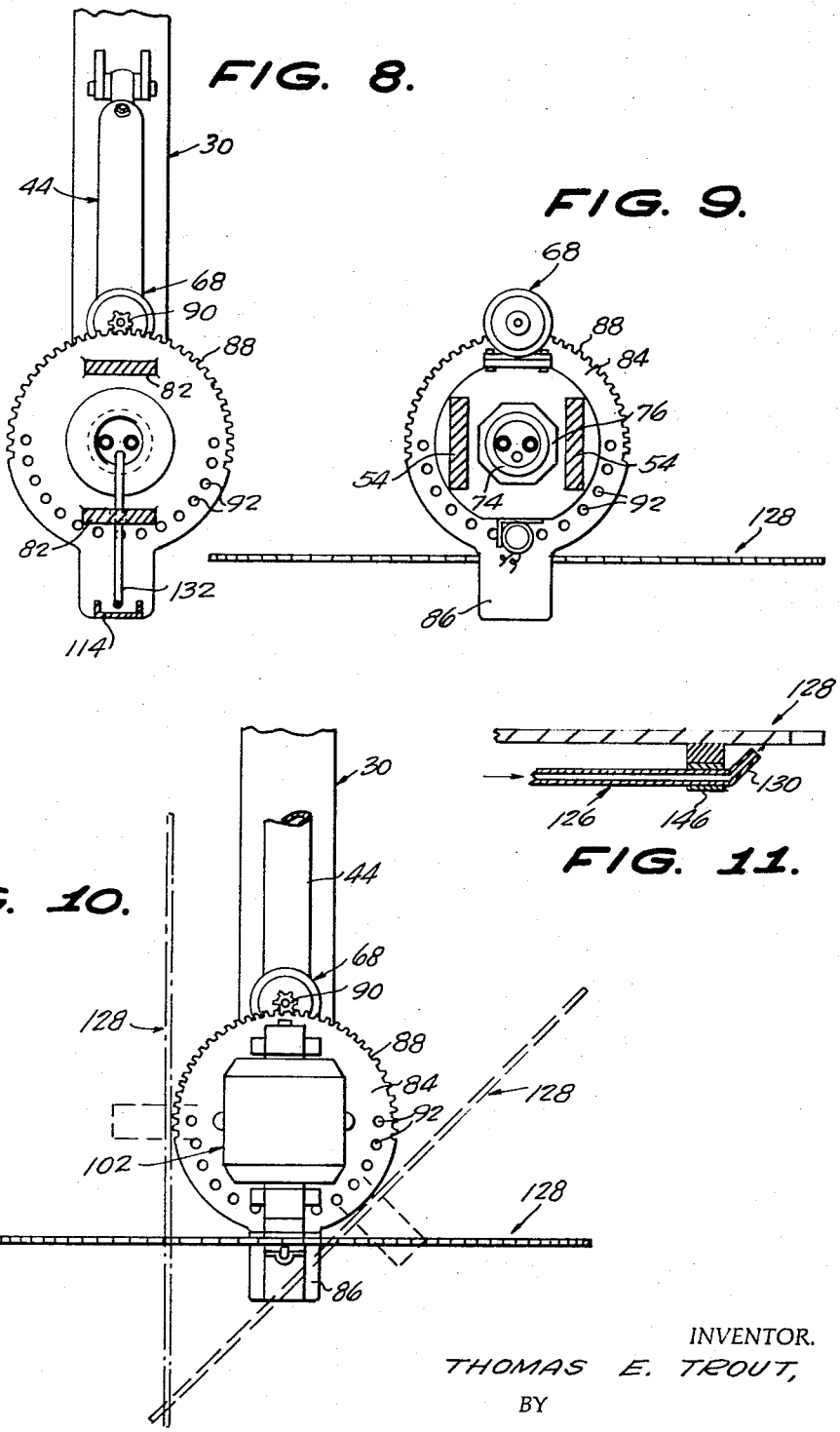

United States Patent Office 3,343,575
Patented Sept. 26, 1967

3,343,575
TREE AND BRUSH ROTARY SAW ATTACHMENT
Thomas E. Trout, 2628 E. Cornell St.,
Lubbock, Tex. 79403
Filed July 9, 1965, Ser. No. 470,852
6 Claims. (Cl. 144—34)

ABSTRACT OF THE DISCLOSURE

An attachment for the free end of the boom of a back-hoe, said attachment comprising: a frame pivoted to the boom and means to tilt the frame about said pivot; a second frame secured to said first frame for pivotal movement about an axis at right angles to the axis of said first pivot and means for moving said second frame about said second-named pivot; a tool mounted in said second frame for rotation about an axis at right angles to both said axes and means to rotate said tool.

This invention relates to a tree and brush rotary saw attachment for tractors.

The primary object of the invention is the provision of a simple, inexpensive, and highly efficient and highly maneuverable, one-man operated attachment of the kind indicated, which is adapted to be carried by, and manipulated relative to the work, by a tractor-mounted device, such as a back-hoe assembly, the attachment being maneuverable for sawing at different elevations, relative to the ground, and at different angles, for sawing brush and trees, for clearing land, and for cutting up tree trunks and limbs into desired lengths.

Another object of the invention is the provision of an attachment of the character indicated above, which is provided with means for applying tree and brush-killing fluid to the saw blade, and to the resultant stumps, whereby such fluid is transferred, at the time of a sawing operation, to tree or brush stumps, so as to effect arrest of growth and the destruction thereof, whereby such desirable destruction, which would otherwise entail extensive labor and expense, and be neglected for these reasons, is produced, at little expense, and at no extra labor, at the time the sawing is done.

In the drawings:

FIGURE 1 is a side elevation, showing an attachment of the invention carried by a tractor mounted back-hoe assembly, the saw blade of the attachment being in a horizontal position.

FIGURE 2 is a top plan view of FIGURE 1;

FIGURE 3 is an enlarged fragmentary vertical longitudinal section, taken on the line 3—3 of FIGURE 2;

FIGURE 4 is an enlarged fragmentary detailed bottom plan view of the attachment;

FIGURE 5 is a top plan view of FIGURE 4;

FIGURE 6 is a side elevation of FIGURE 4;

FIGURE 7 is a schematic fragmentary horizontal section, showing the poison fluid applicator engaged with a side of a tree trunk, through which the saw blade is cutting;

FIGURES 8 and 9 are vertical transverse sections, taken on the lines 8, 8 and 9, 9, respectively, of FIGURE 3.

FIGURE 10 is a fragmentary front elevation of the attachment, showing the saw blade in horizontal position, in full lines, and in perpendicular and angled positions, in phantom lines; and, FIGURE 11 is an enlarged fragmentary vertical longitudinal section, taken on the line 11, 11 of FIGURE 4.

Referring in detail to the drawings, T designates a conventional form of tractor, having an extensible and dirigible assembly, such as a conventional back-hoe H mounted on its forward end. The back-hoe comprises laterally spaced upstanding brackets 14, 14, and laterally spaced, forwardly extending horizontal brackets 16, 16. Vertically elongated, parallel spaced straight standards 18, 18 are pivoted, at their lower ends, as indicated at 20, to the horizontal brackets 16, 16, and are adapted to be pivoted forwardly and downwardly and rearwardly and upwardly, relative to the tractor T, by means of hydraulic cylinders 22. The hydraulic cylinders 22 are pivoted, as indicated at 24, at their rear ends, on the upstanding tractor brackets 14, 14, and, at their upper ends, as indicated at 28, to ears 29 on the upper parts of the standards.

A normally forwardly declining boom 30 has its upper end portion located between the upper ends of the standards 18, 18, and is pivoted thereon, as indicated at 32. A single upwardly extending hydraulic cylinder 34 is pivoted, at its lower end, as indicated at 36, to and between the standards 18, 18, at a location intermediate the ends of the standards. The single cylinder 34 is pivoted, at its upper end, as indicated at 37, to the upper end of the boom 30. Suitable hydraulic control lines 38 and 39 lead to the cylinders 22 and 34, from conventional tractor carried control means (not shown).

On the lower or forward end of the boom 30, a forwardly extending, normally horizontal arm 40 is separably pivoted, as indicated at 42, and a third hydraulic cylinder 44 extends forwardly and downwardly and extends between and is pivoted, as indicated at 46 and 48, to ears 50 and 52, fixed on the boom 30 and the arms 40, respectively, the third cylinder 44 being, like the other hydraulic cylinders, operated from the tractor T. The various hydraulic cylinders are operable to elevate and depress the boom 30, relative to the ground, so as to place the arm 40, at different elevations relative to the ground, and to put the arm 40 at desired positions, from horizontal, to upwardly angled and downwardly angled positions.

The arm 40 is a component of a rotary saw attachment S, of the present invention. The arm 40 comprises a horizontal U-shape having parallel spaced side bars 54, which engage the outer sides of the clevis ears 56 on the lower end of the boom 30, the side bars 54 being spaced and connected, at their forward ends, by a cross member 60.

The cross member 60, as shown in FIGURES 3, 4, 8, and 9, is formed with perpendicular upwardly and downwardly extending flanges 62 and 64, which reach above and below the side bars 54. The upper flange 62 has a rearwardly extending horizontal portion 66, upon which a battery-powered electric motor 68 is fixedly mounted. A horizontal longitudinal solenoid 70 is fixed to the lower end of the lower flange 64.

The cross member 60 is further formed with a centered, rearwardly extending tubular bracket 72, whose bore opens through the cross member, a tubular bearing 74 being engaged through the tubular bracket 72, with a nut 76 engaged on the rear end of the bearing and against the rear end of the bracket 72. The tubular bearing 74 has an enlarged diameter head 78, on its forward end, which is spaced forwardly from the forward side 79 of the cross member 60.

A rotatable carriage 80 comprises a pair of spaced parallel longitudinal flat bars 82 which are fixed to and extend forwardly from a rear vertical circular plate 84, the latter having a pendant extension 86. For at least a semicircle of the upper part of the plate 84, its edge is formed with gear teeth 88, with which a pinion 90, on the shaft of the electric motor 68 is in mesh.

The plate 84 is formed with a semicircle 92 of equally spaced adjustment detent holes, concentrically spaced inwardly from the teeth 88, and extending around the lower part of the plate 84. The solenoid 70 has a core 94, having a reduced tip 96, which is adapted to engage in selected ones of the detent holes 92, for holding the carriage 80, in a selected position of rotation, produced by operation of the electric motor 68, by control means (not shown) on the tractor T. The solenoid core 94 is spring-retracted, as by means of a coil spring 98, circumposed on the core 94, between a head 100 thereon, and the rear end of the solenoid, so that energization of the solenoid is required to project the core 94 forwardly to engage in a hole 92. The plate 84 is formed with a central opening 85 which is journalled on the tubular bearing 74. The plate 84 has a bearing boss 87, on its rear side, which engages a bearing washer 89, circumposed on the bearing 74, between the cross member side 79 and the boss 87, the forward side of the plate 84 being engaged with the head 78.

A vertical hydraulic motor 102 is positioned between and is suitably fixed to the forward ends of the carriage bars 82, and has a downwardly extending shaft 104. The shaft 104 is journalled through a downwardly extending bearing 106, on the lower one of the bars 82, the lower end of the motor shaft 104 being journalled, as indicated at 108, through the top wall 110 of a cylindrical housing 112, which is fixed on the forward end of a third bottom bar 114 of the carriage 80, fixed to and extending forwardly from the lower end of the extension 86 on the carriage plate 84. The lower end of the shaft 104 is notched, as indicated at 116, to agitate tree-killing fluid present in the housing 112.

Communicating, at its lower end, with the housing 112, is a vertical blind bore 118, formed in the shaft 104 and opening to the notch 116. The shaft 104 has circumferentially spaced radial passages 120, communicating with the blind bore 118 and with the interior of a hollow hub 122. The hub 122 is journalled on the shaft 104, between the housing 112 and a rotary saw blade hub 124. The hub 124 is journalled on the shaft 104, between the hollow hub 122 and the bearing 106.

The hollow hub 122 has fixed thereto, a radial, forwardly extending tubular finder arm 126 which extends spacedly along the underside of a circular rotary saw blade 128, fixed on the saw blade hub 124. The finder arm 126 terminates, at its outer end, in an inwardly angled discharge nozzle 130, adapted to discharge tree-killing fluid, such as a mixture of diesel oil and tree poison, against the adjacent side of the saw blade 128, adjacent to its periphery.

Fluid is supplied, under pressure, to the finder arm 126, which rotates freely on the shaft 104, by means of a tube 132, connected, at its forward end, as indicated at 134, to the housing 112. The tube 132 can extend protectively along the third carriage arm 114, and extend rearwardly, through the boom 30 and a standard 18, to a pump 136, mounted on the tractor T, and driven by a motor 138, the pump 136 being in communication with a fluid containing sump 140. A fluid control valve 142, on the tractor T, is provided for the tube 132. A pair of tubes 144, for supplying hydraulic fluid under pressure, from the tractor T, to the motor 102, lead rearwardly from the motor to suitable control means (not shown) on the tractor T.

As shown in FIGURES 3, 4, 7, and 11, as the saw blade 128 is rotated in sawing contact with an object, such as a tree trunk K, a resilient friction pad 146, secured on the finder arm 126, near the nozzle 130, bears frictionally against the saw blade, so that the finder arm is carried around with the saw blade, until the finder arm contacts and is stopped by engagement with the trunk K. The operator then energizes the fluid pump 136, so as to cause tree-killing fluid to be discharged from the nozzle 130, onto the saw blade, so that this fluid then is deposited, from the underside of the blade, onto the top of the stump of the trunk K, produced by the cutting of the saw blade, with the result that the fluid not only covers the top of the stump, but flows down the sides of the stump, onto the ground around the stump, so as to assure killing of the tree stump.

A console 148 can be mounted on the rear of the tractor T to contain and support the various hydraulic and electrical controls.

In mechanical operation, the operator of the tractor operates the hydraulic controls for the components of the extensible and dirigible back-hoe asesmbly H, so as to reach the saw blade 128 to the tree or brush to be cut, and energize the hydraulic saw motor, and at the same time, position the saw blade 128 in the required horizontal, vertical, or angled position, so as to saw through the limb, or trunk of the object K. By properly positioning the saw blade 128, a tree trunk can be cut, close to the ground, tree or brush limbs can be cut off to form a uniform wall of a brush fence, and logs resting on the ground, or elsewhere, can be sawn into desired lengths. The assembly H can be made to reach into and the saw operated in inaccesible places, such as stream beds, while the tractor T is safely based on solid ground.

What is claimed is:

1. In combination, a tractor, an extensible and dirigible carrier assembly mounted on the tractor, a circular saw blade carried by said assembly at the end thereof remote from the tractor, first means controllable from the tractor for extending and retracting, and steering said assembly, and second means controllable from the tractor for rotating the saw blade, said blade being a component of a saw assembly, said saw assembly comprising an arm mounted on the carrier assembly, a carriage rotatably mounted on said arm, a drive motor on the carriage having a vertical shaft on which the saw blade is fixed, a plate on the carriage formed with circumferential teeth, a rotating motor on the arm having a pinion in mesh with said teeth.

2. The combination of claim 1, said carriage plate having an arc of detent holes, releasable detent means on the arm selectively engageable in detent holes.

3. The combination of claim 2, said arm being pivoted on the carrier asembly, angling means acting between the carrier assembly and said arm for angling the arm relative to the carrier assembly.

4. The combination of claim 3, a finder arm freely journalled on the motor shaft and extending along one side of the saw blade, said finder arm having a discharge nozzle discharging to said one side of the blade, and said finder arm being tubular, and tree-killing fluid supply means connected to the finder arm.

5. For use with a back-hoe mounted on a tractor and having a standard pivoted to the tractor and a boom pivoted to the standard, an attachment for mounting on the free end of the boom, said attachment comprising: means to move the attachment relative to the boom about a pivot; power means to rotate the attachment about an axis at right angles to the axis of said pivot and displaceable means to lock the attachment in predetermined angular positions; a tool mounted in said attachment for rotation about an axis at right angles to both the aforesaid axes and means mounted on said attachment for rotating said tool.

6. An attachment as set forth in claim 1, including means to deliver fluid to said tool.

References Cited

UNITED STATES PATENTS

| 2,601,366 | 6/1952 | Chapman | 144—2.11 XR |
| 2,932,127 | 4/1960 | Prance et al. | 47—12 |
| 3,044,509 | 7/1962 | Kehler | 144—2.11 |
| 3,121,974 | 2/1964 | Brantley et al. | 47—12 |
| 3,198,224 | 8/1965 | Hiley | 144—2.11 |

WILLIAM W. DYER, Jr., *Primary Examiner.*

W. D. BRAY, *Assistant Examiner.*